United States Patent
Magee et al.

(10) Patent No.: US 9,762,155 B1
(45) Date of Patent: Sep. 12, 2017

(54) ROTOR FLUX ANGLE AND TORQUE TRAJECTORY CONTROL APPARATUS AND METHODS

(71) Applicant: TEXAS INSTRUMENTS INCORPORATED, Dallas, TX (US)

(72) Inventors: David Patrick Magee, Allen, TX (US); Eric James Thomas, Ann Arbor, MI (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 15/163,450

(22) Filed: May 24, 2016

(51) Int. Cl.
*H03K 5/00* (2006.01)
*H02P 6/08* (2016.01)
*H02P 27/08* (2006.01)
*H02P 21/24* (2016.01)
*H02P 6/18* (2016.01)

(52) U.S. Cl.
CPC ............... *H02P 6/08* (2013.01); *H02P 6/181* (2013.01); *H02P 21/24* (2016.02); *H02P 27/08* (2013.01)

(58) Field of Classification Search
CPC .............................. H02P 25/089; H02P 25/092
See application file for complete search history.

(56) References Cited

U.S. PATENT DOCUMENTS

| | | |
|---|---|---|
| 9,270,220 B2 | 2/2016 | Magee et al. |
| 2004/0201358 A1* | 10/2004 | Kawaji ................. H02P 25/092 318/701 |
| 2015/0084575 A1 | 3/2015 | Magee |
| 2016/0173010 A1* | 6/2016 | Marcetic ................... H02P 3/18 318/759 |

* cited by examiner

*Primary Examiner* — Karen Masih
(74) *Attorney, Agent, or Firm* — John R. Pessetto; Charles A. Brill; Frank D. Cimino

(57) ABSTRACT

Low speed and high speed estimates of rotor angle and speed (LS_θ_EST/LS_ω_EST and HS_θ_EST/HS_ω_EST) relative to the stator are received from a low speed estimator and a high speed estimator, respectively. LS_θ_EST and a subset of torque-controlling I_Q trajectory curve ("IQTC") parameter values appropriate to low speed rotor operation are selected for rotor speeds below a low speed threshold value ω_LOW_THRS. HS_θ_EST and a subset of IQTC curve parameter values appropriate to high speed rotor operation are selected for rotor speeds above a high speed threshold value ω_HIGH_THRS. LS_θ_EST and the low speed subset of IQTC parameter values remain selected for rotor speeds less than ω_HIGH_THRS after accelerating to a rotor speed greater than ω_LOW_THRS. HS_θ_EST and the subset of high speed IQTC parameter values remain selected for rotor speeds greater than ω_LOW_THRS after decelerating to a rotor speed less than ω_HIGH_THRS. Hysteresis in the selection of θ_EST and IQTC parameter values results in smooth acceleration/deceleration control.

20 Claims, 10 Drawing Sheets

ROTOR FLUX ANGLE AND TORQUE TRAJECTORY CONTROL APPARATUS AND METHODS

TECHNICAL FIELD

Embodiments described herein relate to field-oriented control of electric motors, including structures and methods associated with smoothly responding to torque change requests.

BACKGROUND INFORMATION

Three-phase alternating current ("AC") motors with permanent magnet rotors ("PMAC motors") are widely used in a range of industrial, commercial and consumer applications. Fields from magnets mounted on or embedded in the rotor couple with the PMAC motor's current-induced magnetic fields generated by electrical input to the stator. Simplicity, reliability, low cost and controllability using integrated circuit controllers and solid-state drivers contribute to the popularity of such motors.

PMAC motors are suitable for variable or constant-torque applications, where the controller dictate to the motor how much torque to produce at any given speed. This flexibility also makes PMAC motors suitable for variable-speed operation requiring ultra-high motor efficiency.

One method of control of PMAC motors is referred to as "field-oriented control" ("FOC"). FOC controllers use current-switching techniques to independently control motor flux and torque as further described below. PMAC motors rotate synchronously at the same speed as the magnetic fields produced by the stator windings. Thus, for example, if the stator fields are made to rotate at 1,700 rpm, the rotor also turns at 1,700 rpm.

FIG. 1 is a cross-sectional view of a PMAC motor 100. The PMAC motor 100 includes a stator 102 and a rotor 104. The stator 102 is fixed and the rotor 104 rotates relative to the stator 104. The stator 102 has a plurality of teeth 108 extending proximate the rotor 104. Each of the teeth 108 is wound by a conductor to form a coil or winding (e.g., the winding 110) that generates a magnetic field when current flows in the conductor. Windings of several adjacent teeth may be connected in series to form a single phase winding. A three-phase PMAC motor has three separately-phased windings. The rotor 104 has one or more permanent magnets attached to it. The net field orientation of the magnet(s) in the rotor 104 is indicated by north and south poles, N and S, respectively. The PMAC motor 100 operates by varying current in each of the phased windings. Doing so causes the teeth 108 to push or pull on the magnets in the rotor 104 and causes the rotor 104 to rotate. The speed and torque of the PMAC motor 100 are controlled by controlling the magnitude and phase of the current inputs to the three windings of the stator 102. Although examples herein are described with reference to a three-phase PMAC motor, it is noted that similar principles are equally applicable to PMAC motors having a number of phases greater than three.

The maximum torque of the PMAC motor 100 is generated when the angular position of a composite phase vector of the waveform of input current to the windings 110 is perpendicular to both the rotor longitudinal axis and to the angular position of the flux vector in the rotor 104. For permanent magnet motors such as the PMAC motor 100, the rotor flux vector indicates the angular position of the rotor 104. Accordingly, torque control is achieved in the PMAC motor 100 if the instantaneous position of the rotor 104 is known so that the phase(s) of the input current to the windings 110 of the stator 102 can be positioned accordingly.

FIG. 2 is a prior-art block diagram of an FOC-controlled PMAC motor circuit 200. The motor circuit 200 includes a PMAC motor 100, drive circuitry 202, current measurement circuits 205 and an FOC controller 207. Referring to FIG. 2 with reference back to FIG. 1, a feedback loop in the FOC controller 200 processes current levels sensed from the windings 110 of the stator 102. Current measurement circuits 205 measure levels of at least two of the three stator currents. At a sampling time, analog-to-digital converters ("ADCs") 208 convert the measured stator current levels to a vector of discrete digital values representing stator current values I_A, I_B and I_C for further processing in the digital domain. The current values I_A, I_B and I_C are referenced to a three-dimensional coordinate system (A,B,C) that is fixed relative to the stator 102.

The stator current values I_A, I_B and I_C are transformed from the (A,B,C) coordinate system into equivalent stator current values I_$\alpha$ and I_$\beta$ in a two-dimensional vector space ($\alpha$, $\beta$) via a well-known Clarke matrix transform 208. For purposes of visualization as illustrated in FIG. 1, the stator current values I_$\alpha$ and I_$\beta$ lie on mutually orthogonal coordinate axes CA_$\alpha$ 115 and CA_$\beta$ 118. The ($\alpha$,$\beta$) coordinate system is orthogonal to the longitudinal axis of the stator 102 and is also stationary relative to the stator 102. Axis CA_$\alpha$ 115 is shown aligned with one of the original three-phase axes CA_A. Axis CA_$\alpha$ 115 and the original three-phase axis CA_A can be thought of as extending along a zero degree radius of a circle formed by the stator.

A well-known Park transform generates a direct-axis stator current representation I_D 222 and a quadrature-axis stator current representation I_Q 224 from the current values I_$\alpha$ and I_$\beta$. I_D 222 and I_Q 224 are calculated by rotating the ($\alpha$,$\beta$) coordinate system through an angle $\theta$ 135 and using the magnitudes of I_$\alpha$ and I_$\beta$ values accordingly. $\theta$ 135 is the angle between a reference position of the stator 102 (e.g., relative to CA_$\alpha$ 115) and the instantaneous position of the rotor 104. Thus, currents I_D 222 and I_Q 224 represent stator current in a (D,Q) reference frame that is rotating with an angular velocity $\omega$ equal to that of the rotor 104 relative to the stator 102. Operation of the Park transform is analogous to an observer standing at a reference point on the periphery of a merry-go-round. The periphery is stationary relative to the ground is likened to the stator of a PMAC motor. The central, rotating portion of the merry-go-round is likened to the rotor. From one's position on the periphery, the observer can "see" the stator current vectors as stationary in both the (A, B, C) and the ($\alpha$,$\beta$) coordinate systems. The observer sees the I_D 222 and I_Q 224 stator current vectors as rotating in the plane of the floor of the rotating central portion of the merry-go-round. Suddenly the observer jumps from the ($\alpha$,$\beta$) coordinate system at the periphery to the (D,Q) coordinate system at the rotating central portion of the merry-go-round. The observer now sees the I_D 222 and I_Q 224 stator currents vectors as stationary under her feet.

Turning again to FIG. 2, it can be seen that $\theta$ 135 of FIG. 1 is an input to the Park transform. Park uses trigonometric functions that are a function of $\theta$ 135 to generate I_D 222 and IQ 224 from I_$\alpha$ and I_$\beta$. A rotor position sensor 225 senses the angular position of the rotor 104 during motor operation and provides the corresponding rotor flux angle $\theta$ 135 to the Park transform 215. A Hall effect or similar sensor may be used as the rotor position sensor 225. I_D 222 is an indication of the instantaneous flux of the rotor 104 with respect to the stator 102, as noted above. In contrast, I_Q 224 is an indication of the instantaneous torque currently being exerted by the stator 102 on the rotor 104. Knowing the current values of rotor flux and motor torque enable precise control of these parameters by electronically controlling the magnitude and frequency of the drive current waveforms into the tri-phasic windings of the stator 102 as follows.

I_D error amplifier 227 subtracts I_D 222 from a D-axis reference current input level I_D_REF 229 to generate an I_D error signal I_D_ERR. I_Q error amplifier 232 subtracts I_Q 224 from a Q-axis reference current input level I_Q_REF 234 to generate an I_Q error signal I_Q_ERR. The I_D_ERR and I_Q_ERR are processed in I_D and I_Q controllers 240 and 243 to generate control voltage signals V_D_CTL and V_Q_CTL, respectively. Controllers 240 and 243 may be proportional-integral controllers or proportional-integral-derivative controllers as are known in the art.

Inverse Park transform 248 transforms the control voltage signals V_Q_CTL and V_D_CTL from the rotating (D, Q) rotor reference frame to the stationary ($\alpha$, $\beta$) stator reference frame using the measured rotor flux angle $\theta$ 135. Doing so generates control voltage signals V_$\alpha$_CTL and V_$\beta$_CTL. A space vector generator 253 performs an inverse Clarke transform on V_$\alpha$_CTL and V_$\beta$_CTL in order to convert the control voltage signals to the three-phase (A, B, C) domain. The space vector generator 253 timing signals T_A, T_B and T_C, each proportional to a desired stator winding voltage. A PWM driver 258 uses T_A, T_B and T_C to generate three pulse-width modulation ("PWM") pulse trains, one associated with each of the three stator windings A, B and C. A power driver module 262 provides gate drive current for each of the PWM pulse trains A, B and C to a three-phase inverter 268. The inverter 268 converts a direct current ("DC") reference voltage to the corresponding PWM voltage pulse for each motor phase. The duration of each voltage pulse is proportional to a corresponding PWM pulse train duty cycle. Each voltage pulse is applied across a corresponding one of the three stator windings of the PMAC motor illustrated in FIG. 1

Although capable of precisely controlling the flux and torque of the PMAC motor 100, the FOC circuit of FIG. 2 depends upon a mechanical sensor (e.g., a Hall sensor or the like) to obtain the rotor flux angle $\theta$. Such sensors are a potential point of failure and add to the cost of the PMAC motor 100.

FIG. 3 is a prior-art block diagram of an FOC-controlled PMAC motor circuit 300. The motor circuit 300 includes a PMAC motor 100, drive circuitry 202, current/voltage measurement circuits 305 and an FOC controller 307. The FOC controller 307 is similar to the FOC controller 207 previously described with reference to FIG. 2. That is, the FOC controller 307 includes the ADCs 208, the Clarke transform module 212, the Park transform module 215, the direct-axis and quadrature-axis error amplifiers 227 and 232, respectively, the direct-axis and quadrature-axis controllers 240 and 243, respectively, the inverse Park transform module 248, the space vector generator 253, and the PWM driver 258, all coupled together and capable of operating as previously described for the FOC controller 207 of FIG. 2.

However, the FOC controller 307 of the motor circuit 300 also includes a high speed estimator 315. The high speed estimator 315 receives samples of I_D and I_Q as well as samples of V_D and V_Q transforms of instantaneous stator winding voltages V_A, V_B and V_C. V_D and V_Q are generated by a second set of ADCs 308A, a second Clarke transform module 312 coupled to the second set of ADCs 308A, and a second Park transform module 316 coupled to the second Clarke transform module 312. The FOC controller further includes an ADC 308B coupled to the high speed estimator 315. The ADC 308B converts the measured direct current ("DC") reference voltage into a discrete digital value representing the bus voltage V_BUS.

From these inputs, the high speed estimator 315 calculates variations in a back electromotive force ("back-EMF") induced in the stator windings 110 of the PMAC motor 100 by the rotation of the permanent magnets associated with the rotor 104. The high speed estimator 315 then uses the back-EMF calculations to generate an estimated instantaneous rotor flux angle HS_$\theta$_EST 318 and an estimated angular velocity HS_$\omega$_EST 322 of the rotor 104 with respect to the stator 102. HS_$\theta$_EST 318 is used by the Park and iPark transforms as previously described for $\theta$ 135 of FIGS. 1 and 2. HS_$\omega$_EST 322 is input by a speed controller 330. The speed controller processes HS_$\omega$_EST 322 and a requested motor speed input $\omega$_REQ to generate the I_Q_REF signal 234 previously described with reference to FIG. 2.

The FOC-controlled PMAC motor circuit 300 and the associated high speed estimator-based FOC controller 307 are further described in related U.S. Patent Publication No. US 2015/0084575 A1, filed Jul. 22, 2014 and incorporated herein by reference in its entirety.

Accurate estimation of rotor position (e.g., HS_$\theta$_EST 318) and angular velocity (e.g., HS_$\omega$_EST 322) by the high speed estimator 315 presupposes a back-EMF signal of adequate magnitude and fidelity. Because the amplitude of back-EMF is proportional to rotor speed, a PMAC motor operating at low speed may not produce a back-EMF signal sufficient to be accurately processed by the high speed estimator 315. In the case of a motor at rest driven by an FOC controller that has just received a speed request, no back-EMF signal at all is available. These conditions may frequently occur in PMAC motor applications such as the case of an eBike with a PMAC motor integrated to assist with pedaled propulsion, or an electronically-agitated direct-drive washing machine which must agitate slowly and frequently reverse direction, for example.

FIG. 4 is a prior-art block diagram of an FOC-controlled PMAC motor circuit 400. The motor circuit 400 includes a PMAC motor 100, drive circuitry 202, current measurement circuits 205 and an FOC controller 407. The FOC controller 407 are similar to the FOC controller 307 previously described with reference to FIG. 3. That is, the FOC controller 407 includes the ADCs 208, 308A and 308B, the Clarke transform modules 212 and 312, the Park transform modules 215 and 316, the high speed estimator 315, the direct-axis and quadrature-axis error amplifiers 227 and 232, respectively, the direct-axis and quadrature-axis controllers 240 and 243, respectively, the inverse Park transform module 248, the space vector generator 253, and the PWM driver 258, all coupled together and capable of operating as previously described for the FOC controller 307 of FIG. 3.

In addition, the FOC controller 407 includes a low speed estimator 415 to generate an estimated instantaneous flux angle LS_$\theta$_EST 418 of the rotor with respect to the stator. The low speed estimator 415 also generates an estimated angular velocity LS_$\omega$_EST 422 of the rotor 104 with respect to the stator 102. The low speed estimator operates by injecting a high frequency excitation signal V_D_EXC 420 with the direct-axis control signal V_D_CTL at an injection point 425.

The technique, referred to as "high frequency injection" ("HFI"), depends upon the property of "saliency" associated with the windings 110 of the stator 102. Saliency is a dependency of the inductance of each of the windings 110 and the position of the poles of the permanent magnets associated with the rotor 104. V_D_EXC 420 is ineffective as a drive signal to generate torque on the rotor 104. However, V_D_EXC 420 generates small components of stator currents in the various windings from which to measure each winding's inductance. The estimator 415 generates LS_θ_EST 418 based upon differences in inductances in the various windings in the presence of V_D_EXC 420 as influenced by the position of the magnetic field associated with the permanent magnets of the rotor 104. The low speed estimator 415, also referred to as an initial position detector ("IPD"), is accurate at low or even zero rotor angular velocities. Additional information regarding the low speed estimator 415 may be found in related U.S. Pat. No. 9,270,220 B2, filed Apr. 4, 2014 and incorporated herein by reference in its entirety.

SUMMARY OF THE INVENTION

Figure 1:
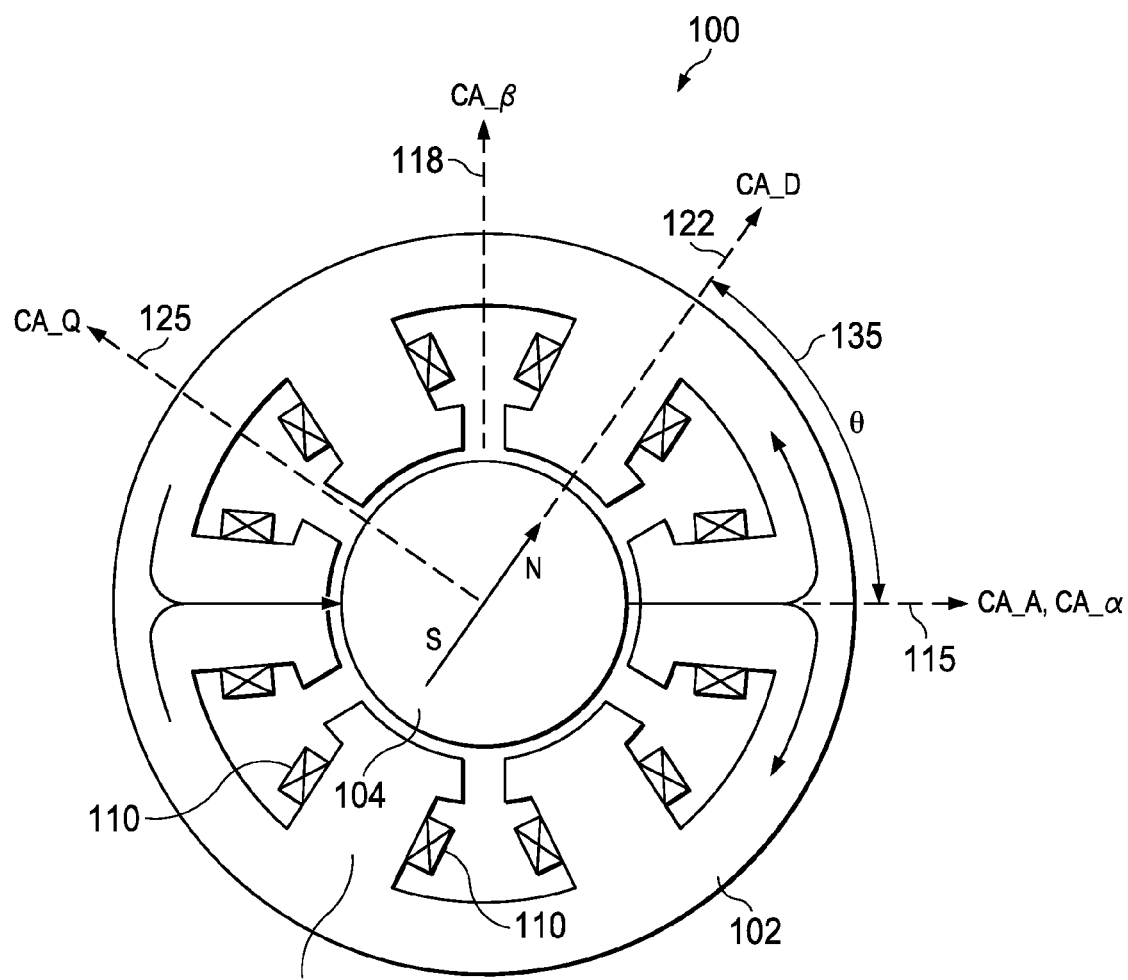
FIG. 1 is a cross-sectional view of a PMAC motor.

Structures and methods disclosed herein operate to smoothly control the angular acceleration of a rotor in a PMAC motor throughout the motor's speed range. The terms "motor speed" and "rotor speed" as used herein are defined as the instantaneous angular velocity of the rotor with respect to the stator. The terms "speed" and "angular velocity" are used interchangeably herein. The term "rotor position" is used herein synonymously with the term "rotor flux angle." Both of the latter terms mean the angle θ between a zero-degree radial axis of the stator (e.g., the axis CA_α 115 of FIG. 1) perpendicular to a stator longitudinal axis and a radial axis of the rotor aligned with the north pole of the rotor permanent magnet flux field (e.g., the radial axis CA_D 122) and perpendicular to a rotor longitudinal axis.

Figure 3:
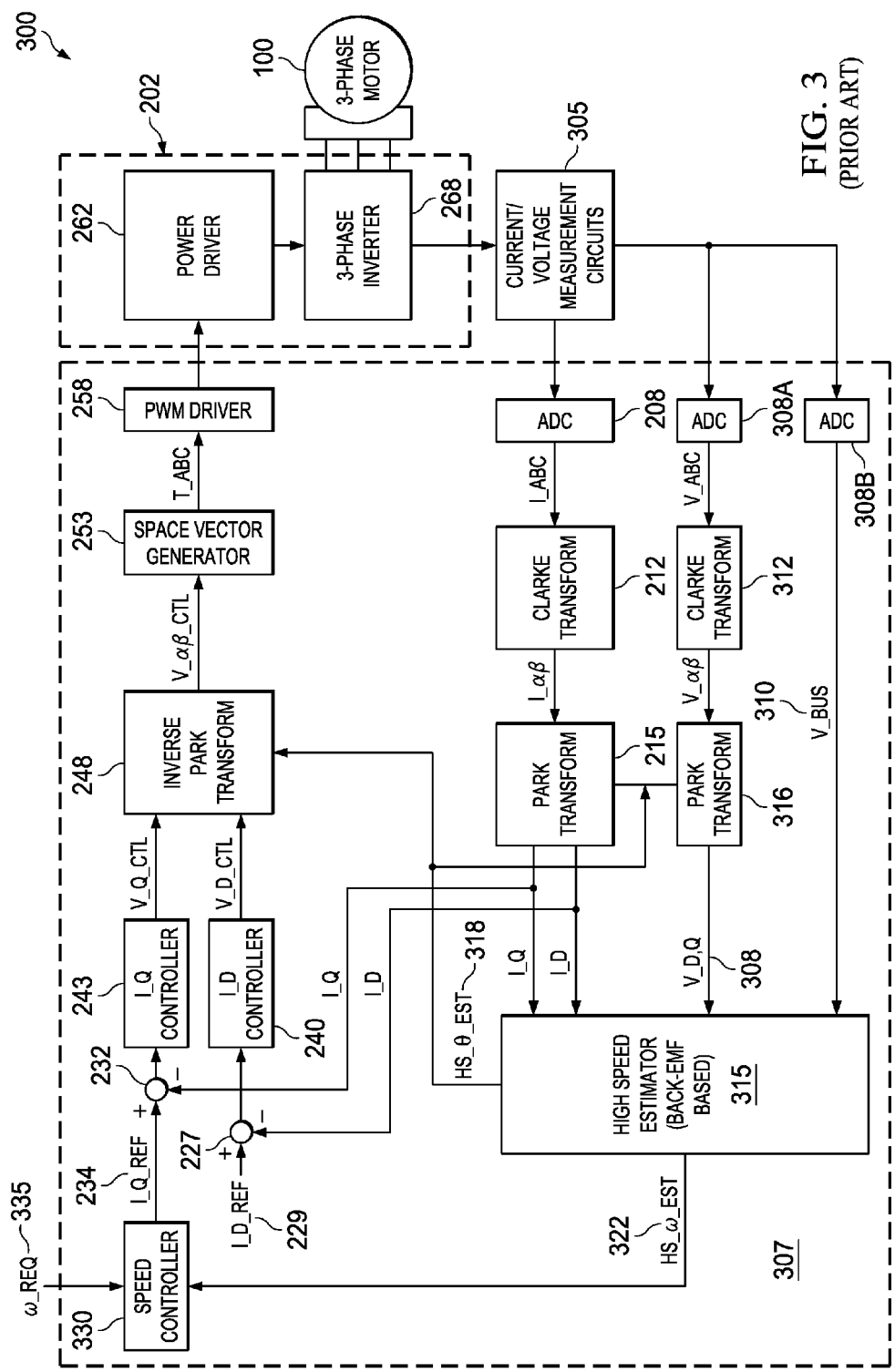
FIG. 3 is a prior-art block diagram of an FOC-controlled PMAC motor circuit including a high-speed estimator.

FOC controller embodiments herein disclosed include both a low speed estimator and a high speed estimator. The low speed estimator provides estimates of an instantaneous rotor flux angle LS_θ_EST and a rotor angular velocity LS_ω_EST as previously described for the FOC controller 407 of FIG. 4. The high speed estimator provides estimates of an instantaneous rotor flux angle HS_θ_EST and rotor angular velocity HS_ω_EST as previously described for the FOC controller 307 of FIG. 3.

Embodiments herein compare rotor speeds from the two estimators to pre-established low and high threshold rotor speeds in order to track rotor speed states relative to the threshold speeds. Doing so permits the disclosed structures and methods to select a rotor flux angle estimate (θ_EST) appropriate to the current rotor speed.

Additionally, some disclosed embodiments include an I_Q trajectory generator. The I_Q trajectory generator outputs a time-sequenced set of values, each representing a magnitude of a quadrature reference current I_Q_REF. A plot of the time-sequenced set of I_Q_REF values appearing at the output of the I_Q trajectory generator is referred to herein as an I_Q trajectory curve ("IQTC"). Some embodiments select a subset of values of IQTC shape-determining or shape-modifying control parameters to send to the I_Q trajectory generator. One subset of such control parameters may be selected while low speed estimates are in use and another subset selected while high speed estimates are in use. Doing so results in smoother motor operation because rotor acceleration and deceleration occur according to profiles appropriate to whether the rotor is initially stationary, rotating slowly, or rotating rapidly.

Hysteresis in the rotor flux angle and angular velocity estimate selection and in the selection of the IQTC parameter values is created for rotor speeds between the low threshold value and the high threshold value. The hysteresis is created by maintaining the selection of low speed rotor estimates and low speed IQTC parameter values while rotor speed is less than the high threshold value after accelerating to a speed greater than the low threshold value. A further condition of the hysteresis is to maintain the selection of high speed rotor estimates and high speed IQTC parameter values while rotor speed is greater than the low speed threshold value after decelerating to a speed lower than the high threshold value. Hysteresis in the selection of the rotor flux angle estimate and in the selection of the IQTC parameter values results in smooth acceleration/deceleration control by avoiding frequent abrupt changes of the aforesaid values as the FOC controller responds to torque change requests.

DETAILED DESCRIPTION

Figure 5:
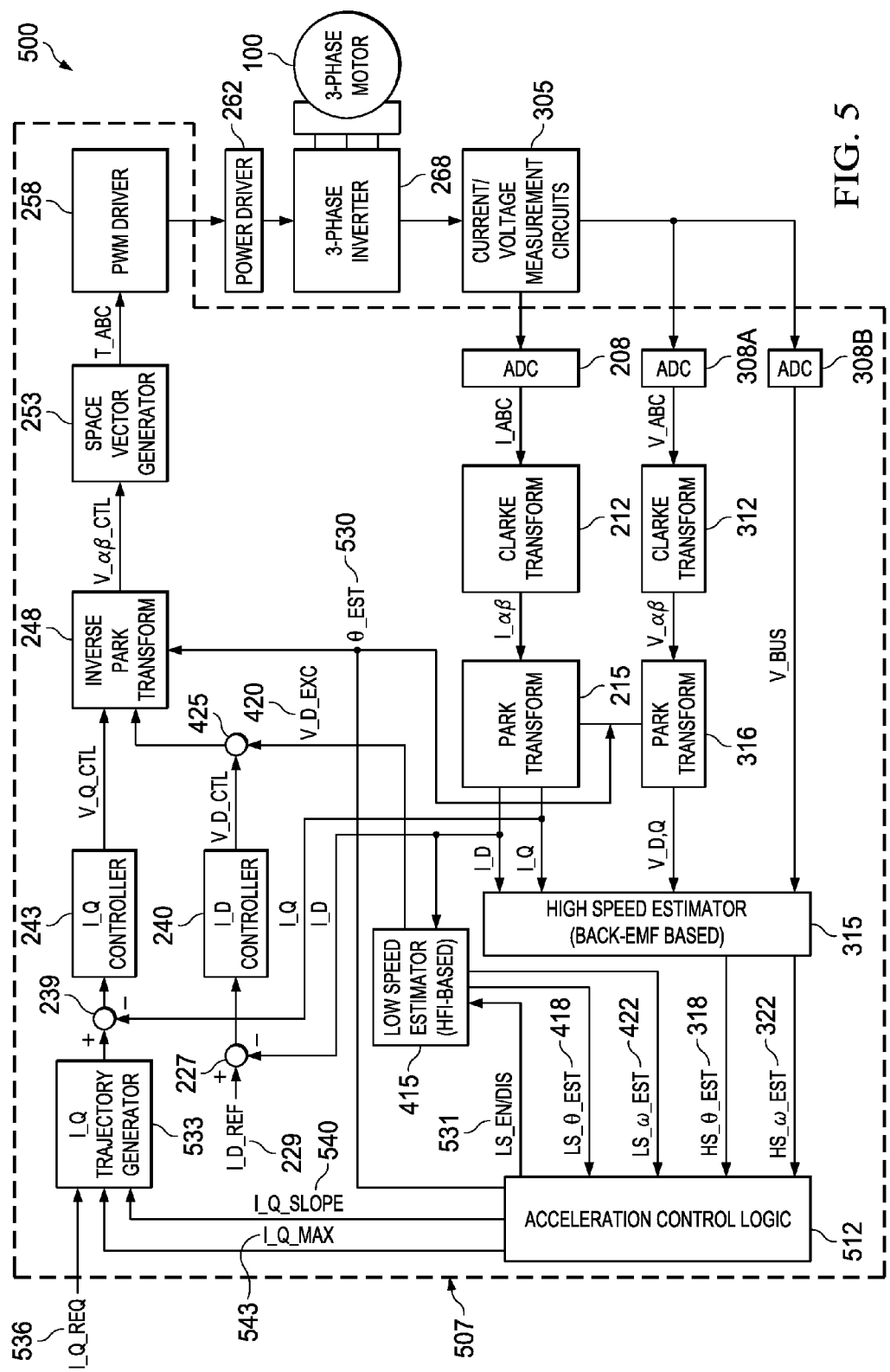
FIG. 5 is a detailed block diagram of a PMAC motor circuit including an FOC controller according to various example embodiments of the invention.

FIG. 5 is a detailed block diagram of a PMAC motor circuit 500 including an FOC controller 507 according to various example embodiments of the invention. The FOC controller 507 is similar in part to the FOC controller 307 previously described with reference to FIG. 3. More specifically, the FOC controller 507 includes the ADCs 208, 308A, and 308B, the Clarke transform modules 212 and 312, the Park transform modules 215 and 316, the high speed estimator 315 to generate the high speed rotor flux angle and angular velocity estimates HS_θ_EST 318 and HS_ω_EST 322, respectively, the direct-axis and quadrature-axis error amplifiers 227 and 232, respectively, the direct-axis and quadrature-axis controllers 240 and 243, respectively, the inverse Park transform module 248, the space vector generator 253, and the PWM driver 258, all coupled together and capable of operating as previously described for the FOC controller 307 of FIG. 3.

Figure 4:
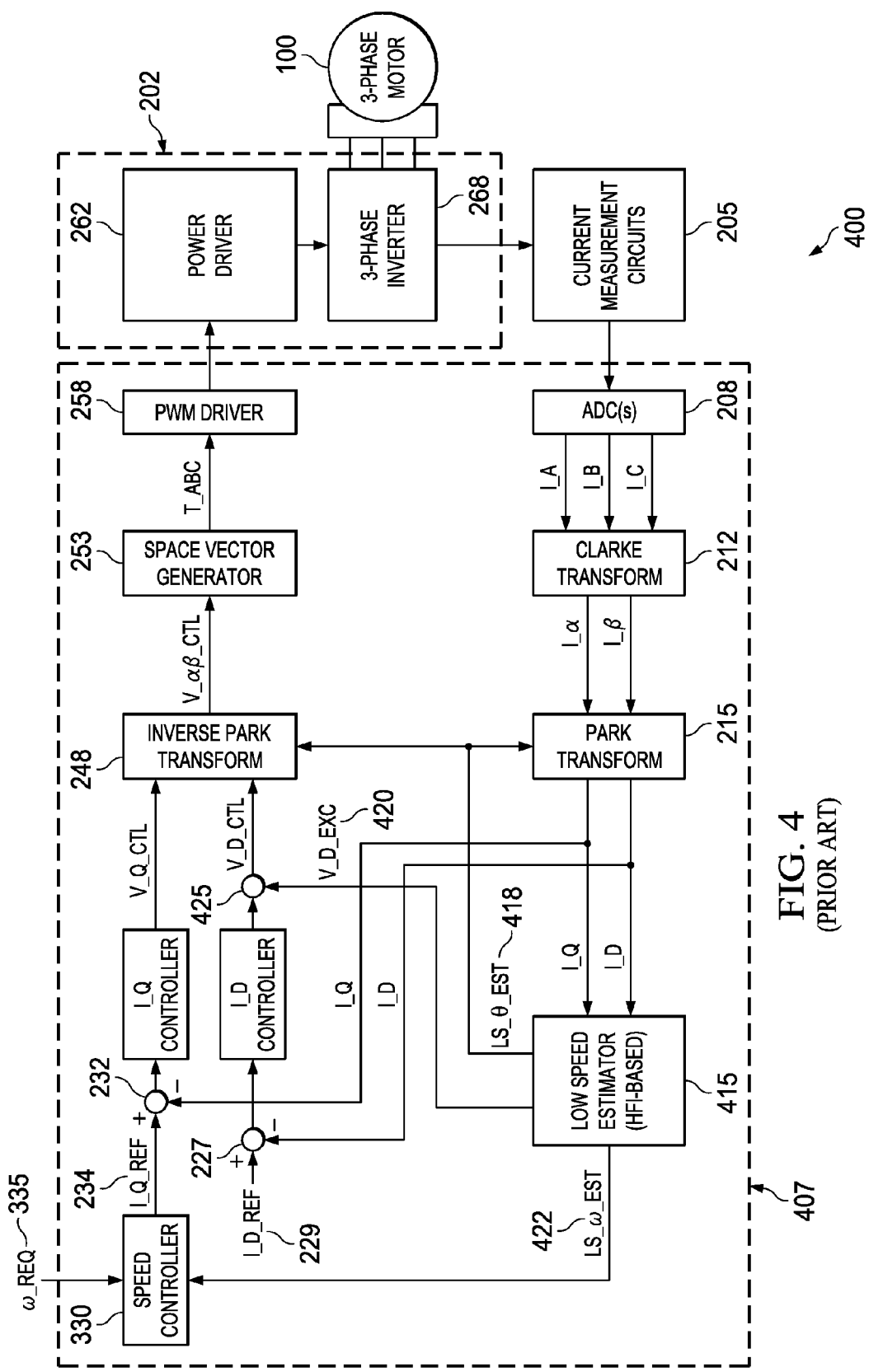
FIG. 4 is a prior-art block diagram of an FOC-controlled PMAC motor circuit including a low-speed estimator.

Additionally, the FOC controller 507 includes the low speed estimator 415 to generate the low speed rotor flux angle and angular velocity estimates LS_θ_EST 418 and LS_ω_EST 422, respectively, and the injection point 425 both coupled together and capable of operating as previously described for the FOC controller 407 of FIG. 4.

The FOC controller 507 further includes an acceleration control logic module ("ACLM") 512 coupled to the low speed estimator 415 and to the high speed estimator 315. The ACLM 512 tracks LS_ω_EST 422 and HS_ω_EST 322 relative to a low rotor angular velocity threshold value ω_LOW_THRS and a high rotor angular velocity threshold value ω_HIGH_THRS. The ACLM 512 selects LS_θ_EST 418 or HS_θ_EST 318 as an estimated rotor flux angle θ_EST 530. The ACLM 512 sends θ_EST 530 to Park transform modules 215 and 316 and to inverse Park transform module 248.

The ACLM 512 operates according to logic described in further detail below to select the estimated rotor flux angle, summarized as follows. The ACLM 512 selects LS_θ_EST 418 while rotor angular velocity is less than ω_LOW_THRS. LS_θ_EST 418 remains selected while rotor angular velocity is less than ω_HIGH_THRS after accelerating to an angular velocity greater than ω_LOW_THRS. The ACLM 512 selects HS_θ_EST 318 while rotor angular velocity is greater than ω_HIGH_THRS. HS_θ_EST 318 remains selected while rotor angular velocity is greater than ω_LOW_THRS after decelerating to an angular velocity lower than ω_HIGH_THRS.

Some embodiments of the FOC controller 507 also include an I_Q trajectory generator 533 coupled to the ACLM 512. The I_Q trajectory generator 533 generates a set of time-sequenced values of a motor torque reference current signal I_Q_REF. A plot of the time-sequenced set of I_Q_REF values forms a trajectory curve IQTC as previously mentioned. The IQTC represents one or more torque requests 536 received by the FOC controller 507 and smoothed by the I_Q trajectory generator 533. Consider, for example, an electric vehicle powered by a PMAC motor controlled by the FOC controller 507. A driver of the vehicle may press the accelerator pedal to the floor while the vehicle is stationary, resulting in a large step-function torque request input 536 to the FOC controller 507. Such a request, if passed directly to the error amplifier 239, would generate a large error signal to the I_Q controller 243 and likely cause a rapid acceleration of the vehicle from a stand-still. The I_Q trajectory generator 533 smoothes the torque request by generating an IQTC in the form of a time-sequenced set of I_Q_REF values of increasing magnitude.

Various embodiments of the I_Q trajectory generator 533 may be implemented to generate IQTCs of various shapes (e.g., linear, exponential, etc.). In an example embodiment described in greater detail below, the I_Q trajectory generator 533 generates an IQTC curve having a linear shape. The I_Q trajectory generator 533 receives a subset of IQTC shape-determining or shape-modifying parameter values selected by the ACLM 512. IQTC parameters associated with the example linear I_Q trajectory generator 533 are a slope of the linear IQTC and a maximum value of I_Q_REF.

The ACLM 512 selects the subset of IQTC parameter values appropriate to a particular range of currently-estimated rotor angular velocities. Thus, for example, some embodiments of the ACLM 512 select a first set of slope and maximum I_Q_REF values when rotor angular velocities are less than ω_HIGH_THRS and ω_EST is equal to LS_ω_EST. The latter condition implies that rotor speed is below ω_HIGH_THRS and that the rotor has not recently decelerated from a speed above ω_HIGH_THRS. The ACLM 512 selects a second set of slope and maximum I_Q_REF values when rotor angular velocities are greater than ω_LOW_THRS and ω_EST is equal to HS_ω_EST. The latter condition implies that rotor speed is above ω_LOW_THRS and that the rotor has not recently accelerated from a speed below ω_LOW_THRS.

Figure 2:
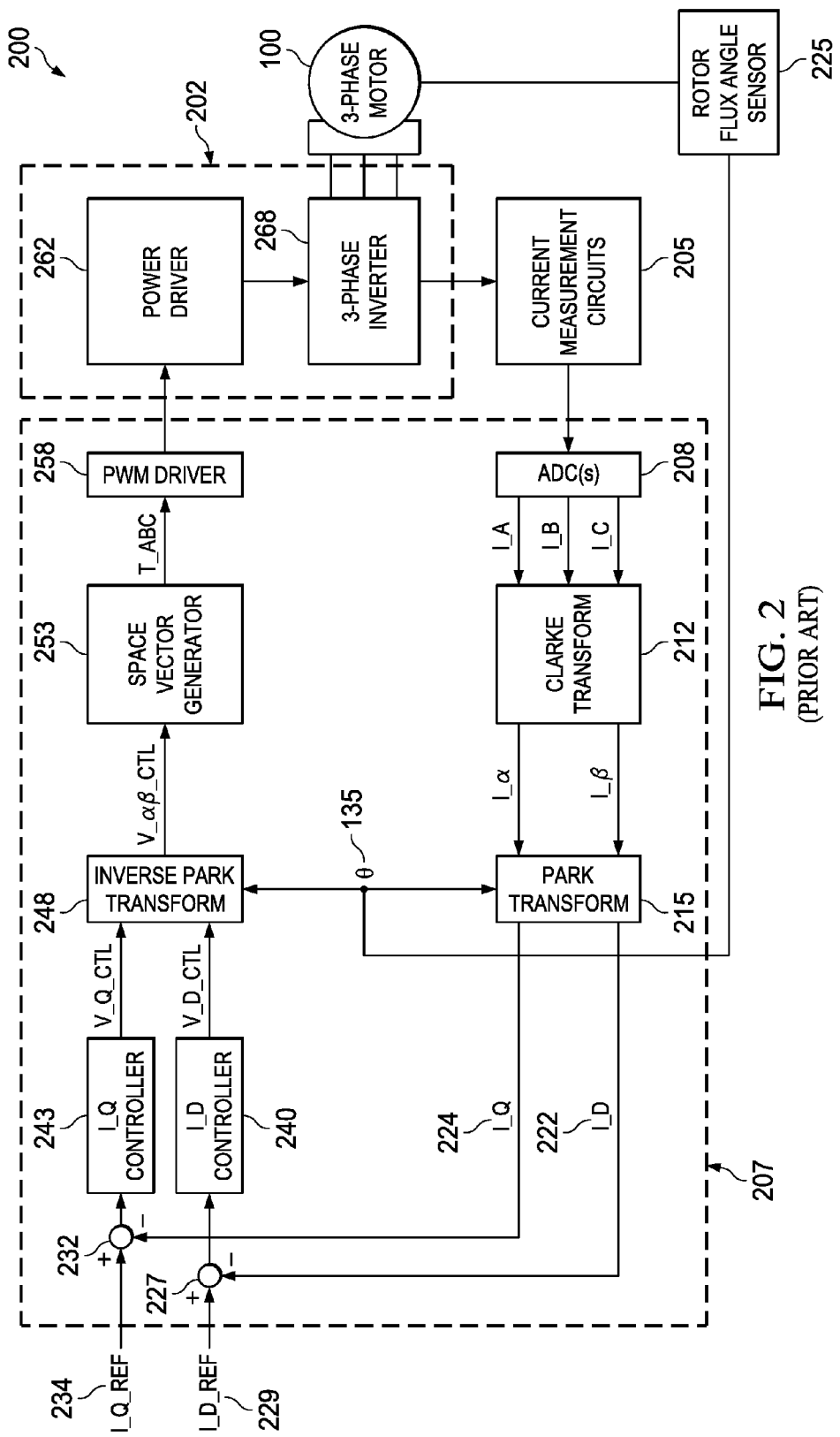
FIG. 2 is a prior-art block diagram of an FOC-controlled PMAC motor circuit.
Figure 6:
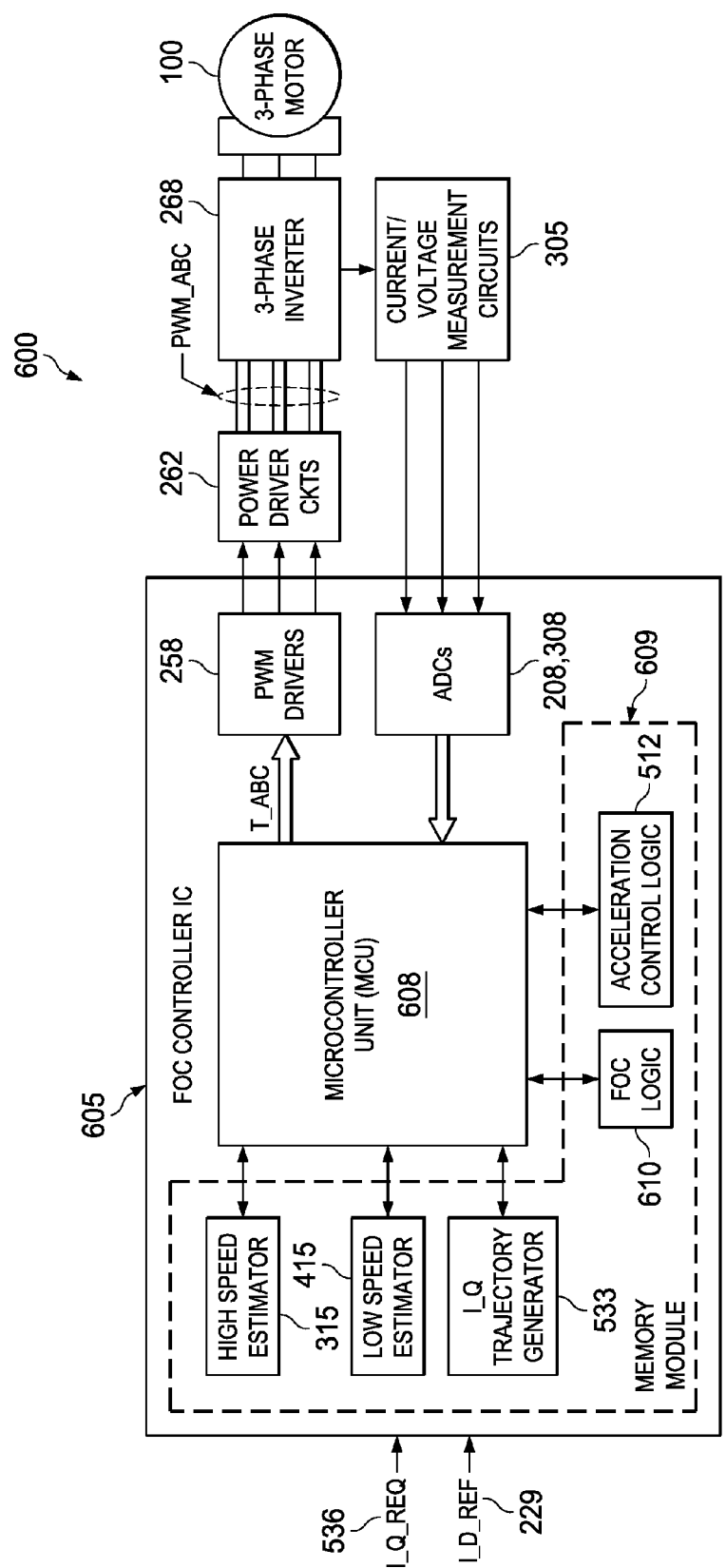
FIG. 6 is a block diagram of a PMAC motor circuit including an FOC controller integrated circuit according to various example embodiments.

FIG. 6 is a block diagram of a PMAC motor circuit 600 including an FOC controller integrated circuit ("IC") 605 according to various example embodiments. The FOC controller IC 605 is an example embodiment of the PMAC motor controller 507 as previously described with reference to FIG. 5. The FOC controller IC 605 includes a microcontroller unit ("MCU") 608. The MCU 608 performs digital-domain processing of current and voltage values measured at a PMAC motor 100. The MCU 608 uses the results of such processing, together with flux reference input values I_D_REF 229 and torque request input values I_Q_REQ 536 to generate timing signals T_ABC. The timing signals T_ABC are used by PWM drivers 258, driver circuits 262, and three-phase inverter 268 to generate phased AC drive voltages to apply across each of the three windings of the PMAC motor 100 as previously described with reference to FIG. 2.

The FOC controller IC 605 also includes one or more semiconductor memory module(s) 609 coupled to the MCU 608. It is noted that in some embodiments the memory module 609 may be included within a semiconductor area associated with the MCU 608. In some embodiments, the memory module 609 may be implemented as one or more ICs packaged together with the FOC controller IC 605 or separately therefrom. The memory module 609 stores values of motor stator winding currents and voltages measured by external measurement circuits 305 and sampled by ADCs 208 and 308. The memory module 609 also stores logical sequences associated with FOC controller-related operations of the MCU 608 as further described below. Each group of such controller-related operations is represented in FIG. 6 as a functional block located within the outline of the memory module 609 (e.g., the functional blocks 315, 415, 512, 533 and 610). In some embodiments, functions performed by one or more of the functional blocks 315, 415, 512, 533 and 610, or portions of such functions, may be implemented in dedicated semiconductor logic such as application-specific integrated circuit ("ASIC") logic portions of the FOC controller IC 605 rather than by the MCU 608.

The FOC controller IC 605 includes an FOC logic module 610 communicatively coupled to the MCU 608. The FOC logic module 610 includes the Clarke transform modules 212 and 312, the Park transform modules 215 and 316, the direct-axis and quadrature-axis error amplifiers 227 and 232, respectively, the direct-axis and quadrature-axis controllers 240 and 243, respectively, the inverse Park transform module 248, and the space vector generator 253, all coupled together and capable of operating as previously described for the FOC controller 507 of FIG. 5.

The FOC controller IC 605 also includes the high speed estimator 315, the low speed estimator 415, the ACLM 512 and the I_Q trajectory generator 533, each communicatively coupled to the MCU 608 and functionally coupled together and capable of operating as previously described for the FOC controller 507 of FIG. 5.

Figure 7:
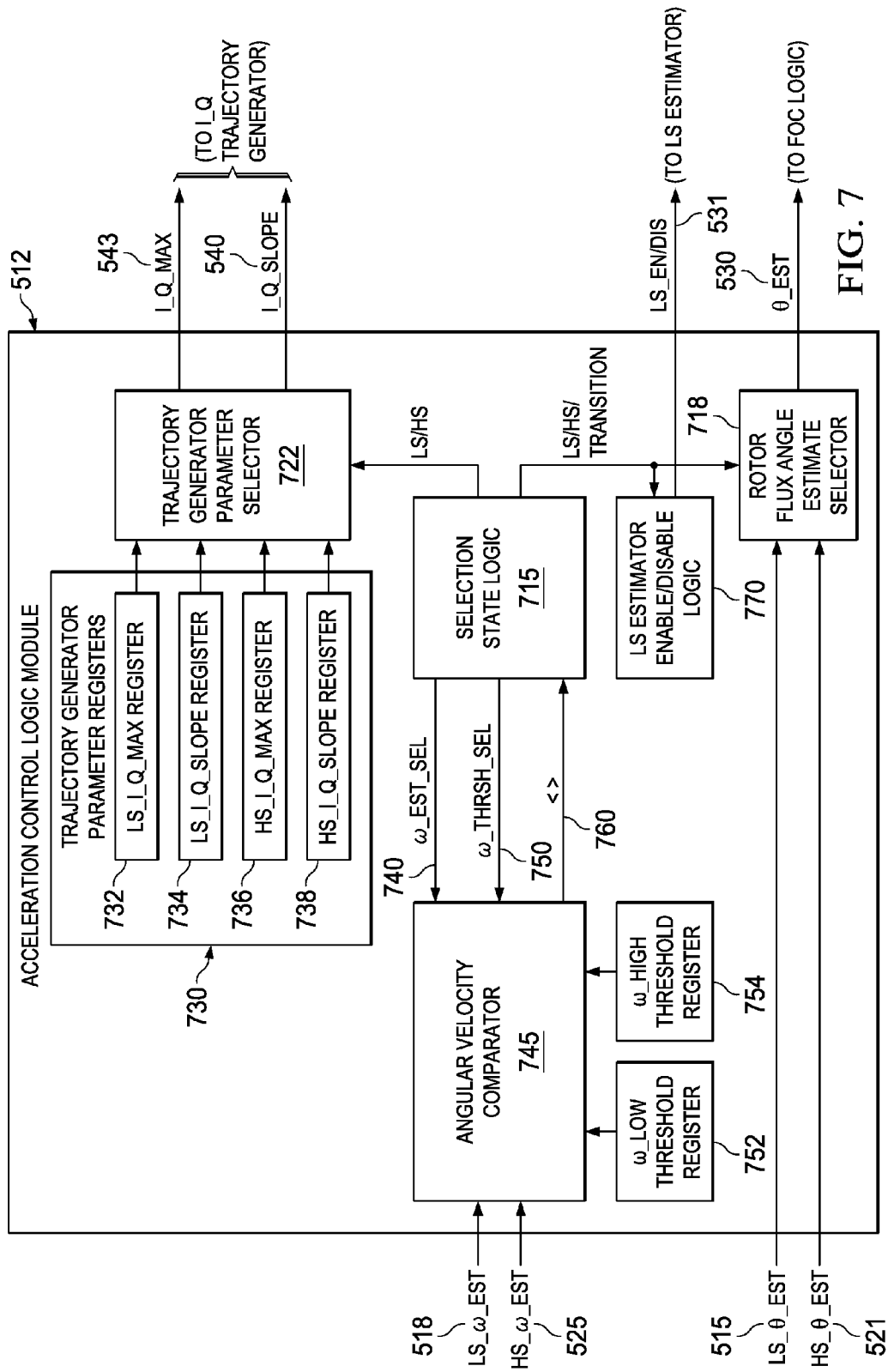
FIG. 7 is a detailed block diagram of an acceleration control logic module according to various example embodiments.

FIG. 7 is a detailed block diagram of an ACLM 512 according to various example embodiments. The ACLM 512 tracks LS_ω_EST 422 and HS_ω_EST 322 relative to a low rotor angular velocity threshold value ω_LOW_THRS and a high rotor angular velocity threshold value ω_HIGH_THRS, as previously described with reference to the FOC controller 507 of FIG. 5. The ACLM 512 selects LS_θ_EST 418 or HS_θ_EST 318 as an estimated rotor flux angle θEST 530. The ACLM 512 also selects a subset of IQTC parameters used by the I_Q trajectory generator 533. The I_Q trajectory generator 533 uses the selected IQTC parameters to control characteristics of an IQTC output. The IQTC operates as an I_Q_REF signal for the forward control portion of the FOC controller 507 of FIG. 5.

The ACLM 512 includes a selection state logic module 715. The selection state logic module 715 selects a current rotor angular velocity estimate ω_EST_SEL 740 and a rotor angular velocity threshold value ω_THRS_SEL 750 to be compared to each other. The selection state logic module 715 subsequently receives a result 760 of the comparison. Based upon the comparison result 760, the selection state logic module 715 enters a low-speed state, a low-to-high speed state, a high speed state, or a high-to-low speed state.

The ACLM 512 also includes a rotor flux angle estimate selector 718 coupled to the selection state logic module 715. The rotor flux angle estimate selector 718 receives current values of LS_θ_EST 515 and HS_θ_EST 521 as inputs. The rotor flux angle estimate selector 718 select LS_θ_EST 515 or HS_θ_EST 521 as a current rotor flux angle estimate θ_EST 530. The selection of LS_θ_EST 515 or HS_θ_EST 521 is based upon a rotor flux angle estimate control input from the selection state logic module 715.

The ACLM 512 further includes a trajectory generator parameter selector 722 coupled to the selection state logic module 715. The trajectory generator parameter selector 722 receives quadrature-axis IQTC parameter values LS_I_Q_MAX, LS_I_Q_SLOPE, HS_I_Q_MAX, and HS_I_Q_SLOPE. The trajectory generator parameter selector 722 selects a maximum quadrature-axis reference value I_Q_MAX 543 as LS_I_Q_MAX or HS_I_Q_MAX. The trajectory generator parameter selector 722 also selects a slope of a quadrature-axis reference value curve I_Q_SLOPE 540 as LS_I_Q_SLOPE or HS_I_Q_SLOPE. I_Q_MAX 543 and I_Q_SLOPE 540 are selected based upon a trajectory generator parameter control input from the selection state logic module 715.

In some embodiments of the FOC controller 507, the quadrature-axis IQTC parameter values LS_I_Q_MAX, LS_I_Q_SLOPE, HS_I_Q_MAX, and HS_I_Q_SLOPE may be chosen by a PMAC motor circuit designer implementing the FOC controller 507. In such case, the ACLM 512 may also include a trajectory generator parameter generator register set 730. In the example embodiment illustrated by FIG. 7, the trajectory generator parameter generator register set 730 includes first, second, third and fourth trajectory generator parameter registers 732, 734, 736 and 738, respectively. Each of the trajectory generator parameter registers 732, 734, 736 and 738 is coupled to the trajectory generator parameter selector 722. The registers 732, 734, 736 and 738 store LS_I_Q_MAX, LS_I_Q_SLOPE, HS_I_Q_MAX and HS_I_Q_SLOPE, respectively.

The ACLM 512 also includes an angular velocity comparator 745 coupled to the selection state logic module 715. The angular velocity comparator 745 receives a current rotor angular velocity estimate LS_ω_EST 518 from the low speed estimator 415 of FIG. 5 and a current estimate HS_ω_EST 525 from the high speed estimator 315. The angular velocity comparator 745 also receives angular velocity threshold values ω_LOW_THRS and ω_HIGH_THRS as inputs. The angular velocity comparator 745 compares a selected one of LS_ω_EST 518 or HS_ω_EST 525 to a selected one of ω_LOW_THRS or ω_HIGH_THRS. The aforesaid selections of rotor speed estimate and rotor speed threshold values are made based upon the control signals ω_EST_SEL 740 and ω_THRS_SEL 750 received from the selection state logic module 715. The angular velocity comparator 745 sends the result of the comparison 760 to the selection state logic module 715.

In some embodiments of the FOC controller 507, the angular velocity threshold values ω_LOW_THRS and ω_HIGH_THRS may be chosen by a PMAC motor circuit designer implementing the FOC controller 507. In such case, the ACLM 512 may include an ω_LOW_THRS register 752 and an ω_HIGH_THRS register 754 coupled to the angular velocity comparator 745. The threshold registers 752 and 754 store the values ω_LOW_THRS and ω_HIGH_THRS, respectively.

In some embodiments, the ACLM 512 may also include a low speed estimator enable/disable logic module 770 coupled to the selection state logic module 715. The low speed estimator enable/disable logic module 770 disables and re-enables the low speed estimator 415 of FIG. 5 based upon a state control signal received from the selection state logic module 715.

Figure 8A:
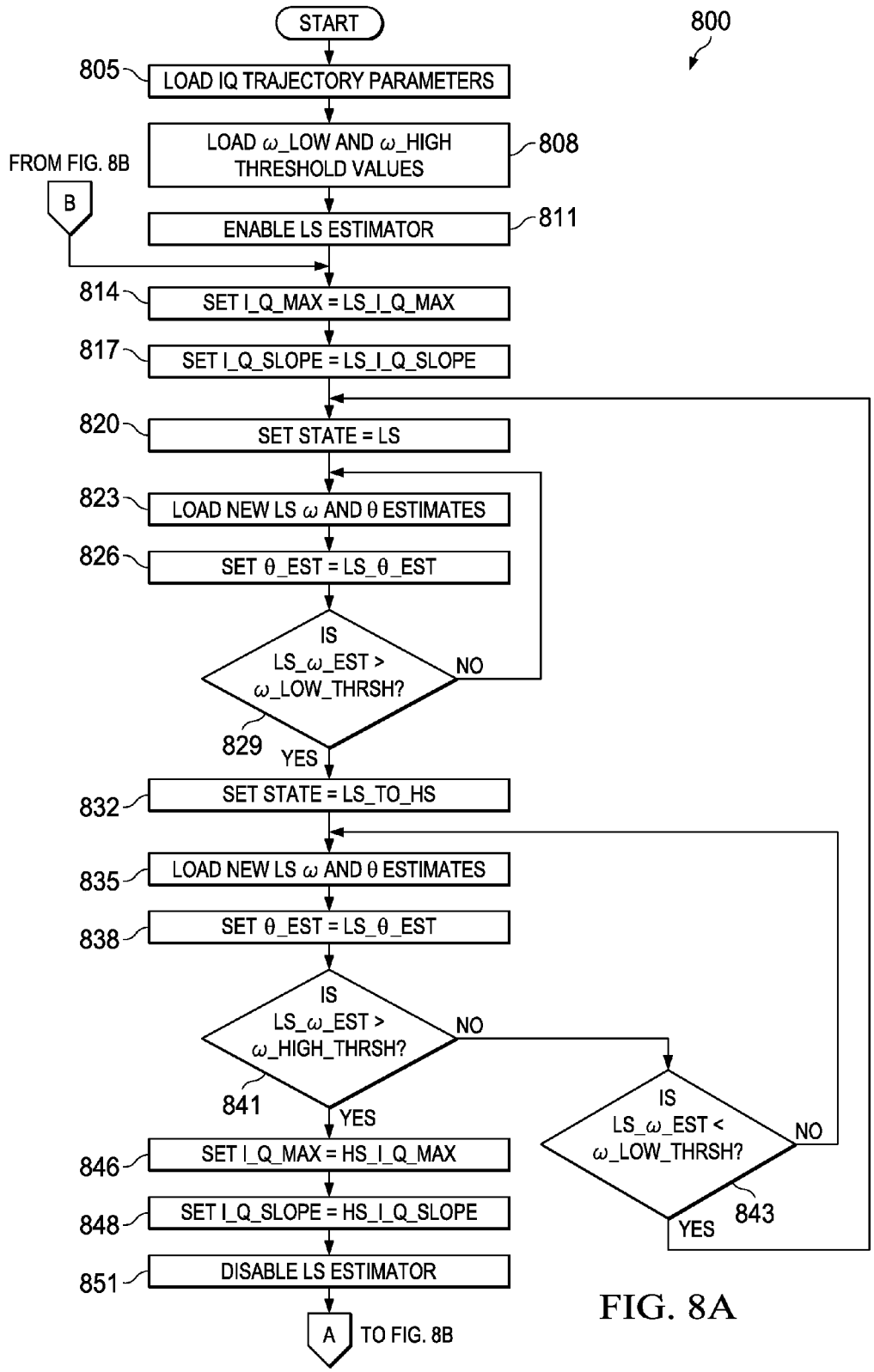
FIG. 8A is a portion of a flow diagram of a method of smoothly controlling rotor angular acceleration of a PMAC motor according to various example sequences.
Figure 8B:
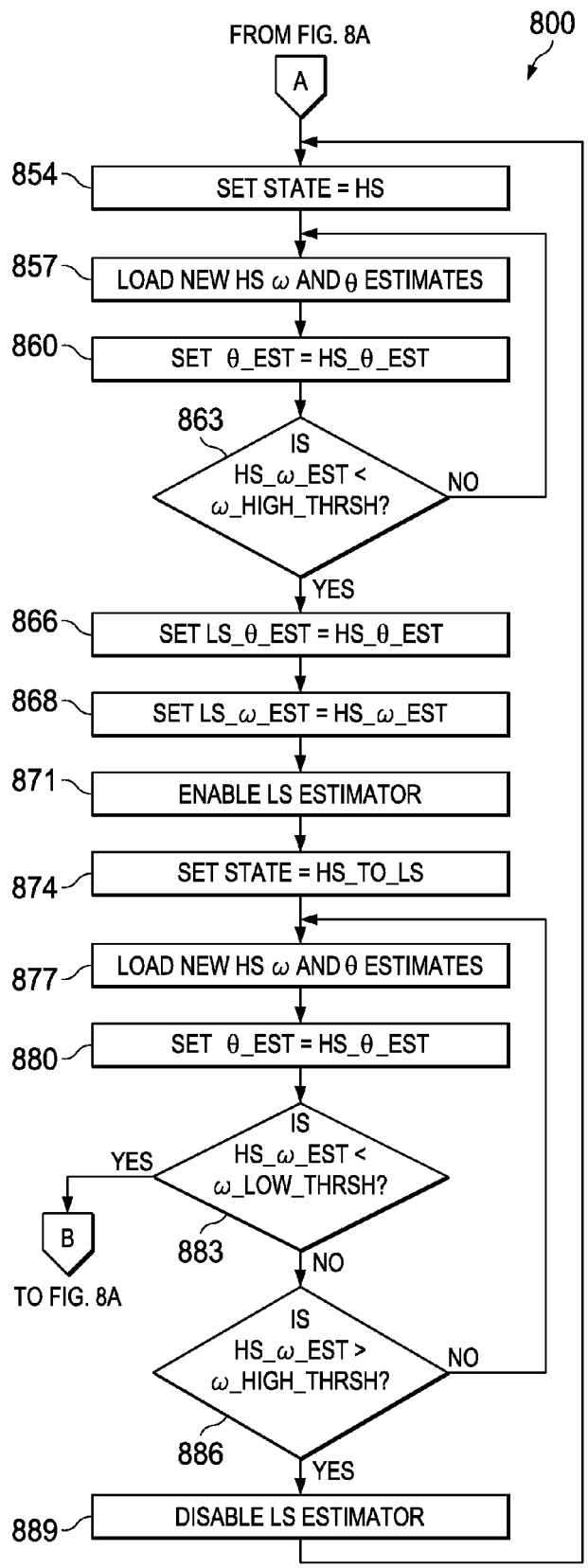
FIG. 8B is a portion of a flow diagram of a method of smoothly controlling rotor angular acceleration of a PMAC motor according to various example sequences.

FIGS. 8A and 8B are portions of a flow diagram of a method 800 of smoothly controlling rotor angular acceleration in a PMAC motor according to various example sequences. The method 800 includes receiving low speed estimates of rotor flux angle LS_θ_EST and rotor angular velocity LS_ω_EST from a low speed estimator. The method 800 also includes receiving high speed estimates of rotor flux angle HS_θ_EST and rotor angular velocity HS_ω_EST from a high speed estimator. The method 800 includes tracking LS_ω_EST and HS_ω_EST relative to a low rotor angular velocity threshold value ω_LOW_THRS and relative to a high rotor angular velocity threshold value ω_HIGH_THRS.

The method 800 includes selecting LS_θ_EST or HS_θ_EST as an estimated rotor flux angle θ_EST. LS_θ_EST is selected while rotor angular velocity is less than ω_LOW_THRS and remains selected while rotor angular velocity is less than ω_HIGH_THRS after accelerating to an angular velocity greater than ω_LOW_THRS. HS_θ_EST is selected while rotor angular velocity is greater than ω_HIGH_THRS and remains selected while rotor angular velocity is greater than ω_LOW_THRS after decelerating to an angular velocity lower than ω_HIGH_THRS.

The method 800 also includes selecting a subset of IQTC parameter values from a set of such values. The selected subset of IQTC parameter values is used to control characteristics of an IQTC representing a set of time-sequenced values of a motor torque reference current signal I_Q_REF. The selected subset of IQTC parameter values corresponds to rotor angular velocities less than ω_HIGH_THRS when ω_EST is equal to LS_ω_EST and to rotor angular velocities greater than ω_LOW_THRS when ω_EST is equal to HS_ω_EST.

The method 800 further includes disabling a low speed estimator used to generate LS_θ_EST and LS_ω_EST at a time when the rotor angular velocity is sufficient to generate accurate values of HS_θ_EST.

Figure 9:
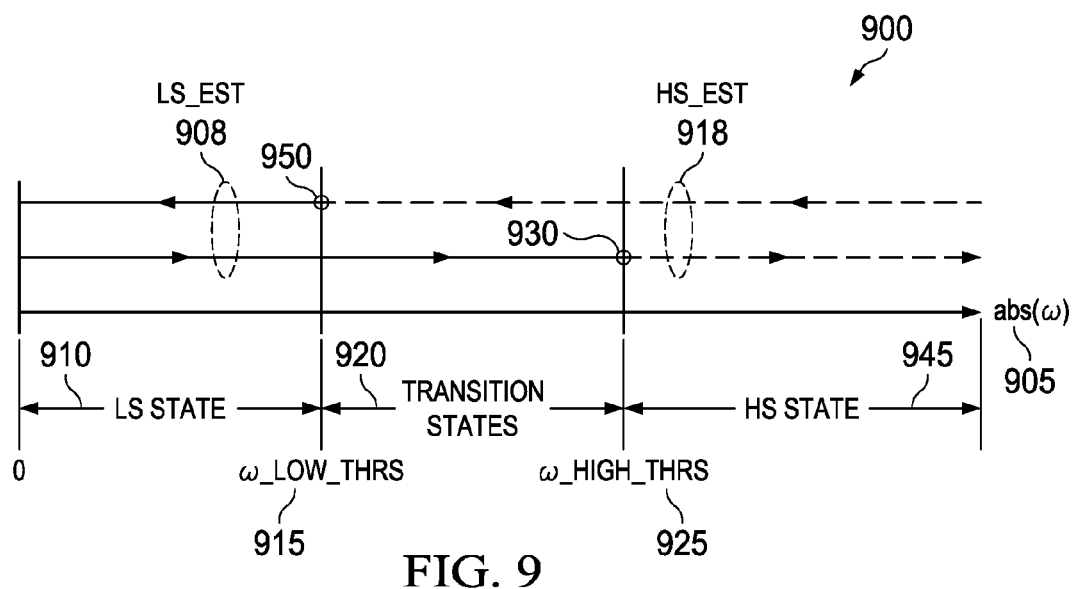
FIG. 9 is a plot illustrating rotor angle and speed estimate selection as a function of increasing and decreasing rotor angular velocity according to various example embodiments and sequences.

FIG. 9 is a plot illustrating rotor angle and speed estimate selection as a function of increasing and decreasing rotor angular velocity ω 905 according to various example embodiments and sequences. Given that the plot is a function of the absolute value of the angular velocity (e.g. abs(ω)), it is valid for both positive and negative speed values. The plot of FIG. 9 summarizes both the operation of the ACLM 512 described above with reference to FIG. 5 as well as the method 800 of FIGS. 8A and 8B. That is, rotor flux angle and angular velocity estimates 908 from the low speed estimator as well as IQTC parameters appropriate for low speed rotor operation are selected for rotor speeds below ω_LOW_THRS 915. Rotor flux angle and angular velocity estimates 918 from the high speed estimator as well as IQTC parameters appropriate for high speed rotor operation are selected for rotor speeds above ω_HIGH_THRS 925.

Hysteresis in the rotor flux angle and angular velocity estimate selection as well as in the IQTC parameter selection is created by the ACLM 512 and by the method 800 for rotor speeds between ω_LOW_THRS 915 and ω_HIGH_THRS 925. The hysteresis is created by maintaining the selection of the low speed rotor estimates and IQTC parameters while rotor angular velocity is less than ω_HIGH_THRS 925 after accelerating to an angular velocity greater than ω_LOW_THRS 915 and by maintaining the selection of the high speed rotor estimates and IQTC parameters while rotor angular velocity is greater than ω_LOW_THRS 915 after decelerating to an angular velocity lower than ω_HIGH_THRS 925. Doing so provides smooth acceleration/deceleration control by avoiding frequent abrupt changes in rotor estimate and IQTC parameter selection.

The method 800 commences at block 805 with loading a set of I_Q trajectory parameter values LS_I_Q_MAX, LS_I_Q_SLOPE, HS_I_Q_MAX and HS_I_Q_SLOPE. The method 800 continues at block 808 with loading rotor angular velocity threshold values ω_LOW_THRS and ω_HIGH_THRS. The method 800 includes enabling the low speed estimator, at block 811. The method 800 also includes setting I_Q_MAX equal to LS_I_Q_MAX, at block 814 and setting I_Q_SLOPE equal to LS_I_Q_SLOPE, at block 817.

The method 800 continues at block 820 with setting an operational state variable to low speed state ("LS"). That is, an indicator of the current operational state is stored in one or more memory locations. The method 800 proceeds at block 823 with loading newly-acquired values of LS_θ_EST and LS_ω_EST. The method 800 includes setting θ_EST equal to the newly-acquired LS_θ_EST, at block 826. The method 800 also includes comparing LS_ω_EST to ω_LOW_THRS to determine whether LS_ω_EST is greater than ω_LOW_THRS, at block 829. That is, referring to FIG. 9, the method 800 includes determining whether the rotor, having been operating in a low speed region of angular velocity 910, has accelerated past a predetermined low threshold speed ω_LOW_THRS 915. If not, the method 800 returns to block 823 to load another set of low speed estimates when the latter are available from the low speed estimator.

If LS_ω_EST is greater than ω_LOW_THRS, the method 800 includes transitioning to a low-to-high speed state ("LS_TO_HS") and setting the operational state variable to LS_TO_HS, at block 832. The method 800 proceeds at block 835 with loading another set of low speed estimates when the latter are available from the low speed estimator. The method 800 includes setting θ_EST equal to the newly-acquired LS_θ_EST, at block 838.

The method 800 includes comparing LS ω_EST to ω_HIGH_THRS to determine whether LS ω_EST is greater than ω_HIGH_THRS, at block 841. That is, referring again to FIG. 9, the method 800 includes determining whether the rotor, having been operating in an intermediate region of angular velocity between ω_LOW_THRS and ω_HIGH_THRS (e.g., the transition states region 920 of FIG. 9), has accelerated past a predetermined high speed threshold value ω_HIGH_THRS 925. If not, the method 800 proceeds to block 843 to compare LS ω_EST to ω_LOW_THRS and to determine whether LS ω_EST is less than ω_LOW_THRS. That is, the method 800 includes determining whether the rotor, having been operating in the transition states region 920, has decelerated below the low-end speed threshold value ω_LOW_THRS 915 and back into the LS state region 910. If not, the method 800 returns to block 835 to continue in the LS_TO_HS state by loading a new set of low speed estimates when the latter are available from the low speed estimator. If, however, the rotor has decelerated below the low-end speed threshold value ω_LOW_THRS 915 and back into the LS state region 910, the method 800 returns to the low speed state at block 820.

If the rotor, having been operating in the transition states region 920, has accelerated past ω_HIGH_THRS 925 (e.g., at a point 930) and into a HS state region of angular velocity 945 as determined at block 841, the method 800 includes establishing a high speed state using a sub-sequence of blocks 846-854. In the latter case, the method 800 includes setting I_Q_MAX equal to HS_I_Q_MAX, at block 846 and setting I_Q_SLOPE equal to HS_I_Q_SLOPE, at block 848. Some versions of the method 800 disable the low speed estimator when the low speed estimates are not being used in order to conserve power. Accordingly, the method 800 optionally includes disabling the low speed estimator, at block 851. The method 800 also includes setting the operational state variable to high speed state ("HS") at block 854.

The method 800 proceeds at block 857 with loading newly-acquired values of HS_θ_EST and HS_ω_EST and setting θ_EST equal to the newly-acquired HS_θ_EST, at block 860. The method 800 also includes comparing HS ω_EST to ω_HIGH_THRS to determine whether HS ω_EST is less than ω_HIGH_THRS, at block 863. That is, referring again to FIG. 9, the method 800 includes determining whether the rotor, having been operating in the high speed region of angular velocity 945, has decelerated past the high speed threshold ω_HIGH_THRS 925. If not, the method 800 returns to block 857 to load another set of high speed estimates when the latter are available from the high speed estimator.

If the rotor has decelerated past the high speed threshold ω_HIGH_THRS 925 as determined at block 863, the method 800 includes establishing a high speed-to-low speed ("HS_TO_LS") state using a sub-sequence of blocks 866-874. In the latter case, the method 800 includes setting LS_θ_EST equal to HS_θ_EST at block 866 and setting LS_ω_EST equal to HS_ω_EST at block 868. The latter substitutions of the high speed estimate values as low speed estimates is done to ensure the availability of low speed estimate values while the low speed estimator is restarting. The method 800 also includes re-enabling the low speed estimator, at block 871. The activities of blocks 866-871 may be omitted for versions of the method 800 which do not quiesce the low speed estimator during operational states when low speed estimates are not used. The method 800 concludes the transition to the HS_TO_LS state by setting the operational state variable to HS_TO_LS, at block 874. The method 800 proceeds at block 877 with loading another set of high speed estimates when the latter are available from the high speed estimator. The method 800 includes setting θ_EST equal to the newly-acquired HS_θ_EST, at block 880.

The method 800 proceeds at block 883 with comparing HS_ω_EST to ω_LOW_THRS to determine whether HS_ω_EST is less than ω_LOW_THRS. That is, referring back to FIG. 9, the method 800 includes determining whether the rotor, having been operating in the transition states region 920, has decelerated past the low-end speed threshold value ω_LOW_THRS 915 (e.g., at a point 950) and into the LS state region 910. If not, the method 800 proceeds to block 886 to compare HS_ω_EST to ω_HIGH_THRS and to determine whether HS_ω_EST is greater than ω_HIGH_THRS. That is, the method 800 includes determining whether the rotor has accelerated above the high speed threshold value ω_HIGH_THRS 925 and back into the HS state region 945. If not, the method 800 returns to block 877 to continue in the HS_TO_LS state by loading a new set of high speed estimates when the latter are available from the high speed estimator. If, however, the rotor has accelerated above the high speed threshold value ω_HIGH_THRS 925 and back into the HS state region 945, the method 800 includes returning to the HS state starting at block 854.

If the rotor has decelerated past ω_LOW_THRS 915 (e.g., at the point 950) and into the LS state region 910 as determined at block 883, the method 800 includes returning to block 814 to re-establish the LS state.

It is noted that some versions of the method 800 may be interrupt driven in lieu of using wait loops to load new rotor position and speed estimates (e.g., the wait loops of block 829 back to block 823, block 843 back to block 835, block 863 back to block 857 and block 886 back to block 877). That is, some versions may include pausing after setting an operational state variable corresponding to the current operational state as previously described. An interrupt driven version of the method 800 may then receive an interrupt from the low speed estimator, the high speed estimator, or both indicating the availability of a newly-determined set of rotor flux angle and angular velocity estimates. The interrupt driven version of the method 800 includes reading the stored operational state variable upon receipt of an interrupt to determine the previously arrived-at operational state. Such version then continues at a rotor position and speed estimate loading activity block corresponding to the previously arrived-at operational state.

Apparatus and methods described herein may be useful in applications other than smoothly controlling acceleration in a PMAC FOC controller. The examples of the FOC controllers 507 and 605, of the ACLM 512, and of the method 800 described herein are intended to provide a general understanding of the structures of various embodiments and the sequences associated with various methods. They are not intended to serve as complete descriptions of all elements and features of apparatus, systems and methods that might make use of these example structures and sequences.

By way of illustration and not of limitation, the accompanying figures show specific embodiments in which the subject matter may be practiced. It is noted that arrows at one or both ends of connecting lines are intended to show the general direction of electrical current flow, data flow, logic flow, etc. Connector line arrows are not intended to limit such flows to a particular direction such as to preclude any flow in an opposite direction. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense. The breadth of various embodiments is defined by the appended claims and the full range of equivalents to which such claims are entitled.

Such embodiments of the inventive subject matter may be referred to herein individually or collectively by the term "invention" merely for convenience and without intending to voluntarily limit this application to any single invention or inventive concept, if more than one is in fact disclosed. Accordingly, although specific embodiments have been illustrated and described herein, any arrangement calculated to achieve the same purpose may be substituted for the specific embodiments shown. This disclosure is intended to cover any and all adaptations or variations of various embodiments.

The Abstract of the Disclosure is provided to comply with 37 C.F.R. §1.72(b) requiring an abstract that will allow the reader to quickly ascertain the nature of the technical disclosure. It is submitted with the understanding that it will not be used to interpret or limit the scope or meaning of the claims. In the preceding Detailed Description, various features are grouped together in a single embodiment for the purpose of streamlining the disclosure. This method of disclosure is not to be interpreted to require more features than are expressly recited in each claim. Rather, inventive subject matter may be found in less than all features of a single disclosed embodiment. The following claims are hereby incorporated into the Detailed Description, with each claim standing with the claims from which it depends as a separate embodiment.

What is claimed is:

1. A field-oriented control ("FOC") motor controller integrated circuit ("IC"), comprising:
   a low speed estimator to generate a low speed estimate of a flux angle of a rotor ("LS_θ_EST") in a motor to be controlled by the FOC controller IC and to generate a low speed estimate of an angular velocity of the rotor ("LS_ω_EST") by injecting an excitation voltage signal ("V_D_EXC") into a stator current control portion of the FOC controller IC and by measuring currents in stator windings of the motor resulting from the injection of V_D_EXC;
   a high speed estimator to generate a high speed estimate of the rotor flux angle ("HS_θ_EST") and to generate a high speed estimate of the rotor angular velocity ("HS_ω_EST") by calculating a back-EMF induced in the stator windings by rotating magnetic fields associated with permanent magnets embedded in the rotor during a time when the rotor is in a rotating state; and
   an acceleration control logic module communicatively coupled to the low speed estimator and to the high speed estimator to track LS_ω_EST and HS_ω_EST relative to a low rotor angular velocity threshold value ω_LOW_THRS and a high rotor angular velocity threshold value ω_HIGH_THRS and to select LS_ω_EST or HS_ω_EST as an estimated rotor flux angle input ("θ_EST") to Park and inverse Park transform modules associated with the FOC controller IC to establish ω_EST equal to LS_ω_EST while rotor angular velocity is less than ω_LOW_THRS, to maintain ω_EST equal to LS_θ_EST while rotor angular velocity is less than ω_HIGH_THRS after accelerating to an angular velocity greater than ω_LOW_THRS, to establish ω_EST equal to HS_ω_EST while rotor angular velocity is greater than ω_HIGH_THRS, and to maintain ω_EST equal to HS_ω_EST while rotor angular velocity is greater than ω_LOW_THRS after decelerating to an angular velocity lower than ω_HIGH_THRS.

2. The FOC controller IC of claim 1, further comprising:
   an I_Q trajectory generator communicatively coupled to the acceleration control logic module to receive at least one I_Q trajectory curve ("IQTC") control parameter from the acceleration control logic module and to generate a set of time-sequenced values of a motor torque reference current signal I_D_REF in the shape of an IQTC, the IQTC parameter(s) selected by the acceleration control logic module to correspond to one of rotor angular velocities less than ω_HIGH_THRS when ω_EST is equal to LS_ω_EST and to rotor angular velocities greater than ω_LOW_THRS when ω_EST is equal to HS_ω_EST.

3. The FOC controller IC of claim 2, the IQTC having a linear shape and the IQTC shape parameters being a slope of the linear IQTC and a maximum value of I_Q_REF.

4. The FOC controller IC of claim 1, further comprising:
an FOC logic module communicatively coupled to the acceleration control logic module to receive measured values of currents flowing in motor stator windings, to convert the measured values to scalar feedback values I_D and I_Q associated with a (D,Q) rotor reference frame, to subtract each of I_D and I_Q from corresponding (D,Q) reference current input values I_D_REF and I_D_REF in order to generate corresponding error signals I_D_ERR and I_D_ERR, to process I_D_ERR and I_D_ERR in order to generate forward control voltage signals V_D_CTL and V_Q_CTL, and to convert V_D_CTL and V_Q_CTL to phased, pulse width modulated ("PWM") driver timing signals, the PWM driver timing signals available on output terminals of the FOC controller IC to provide timing for subsequent power driver circuits and a three-phase stator winding drive voltage inverter.

5. The FOC controller IC of claim 4, further comprising:
at least one analog-to-digital converter ("ADC") communicatively coupled to the low speed estimator and to the high speed estimator to convert the measured values of currents flowing in the motor stator windings, voltages measured across the motor stator windings, and/or inverter reference voltages to corresponding digital values.

6. The FOC controller IC of claim 5, further comprising:
a microcontroller unit ("MCU") communicatively coupled to the ADCs, to the low speed estimator, to the high speed estimator, and to the acceleration control logic module to perform operations of the FOC controller IC in the digital domain; and
a semiconductor memory module coupled to the MCU to store the digital values of the motor stator winding currents and voltages sampled by the ADCs and to store logical sequences associated with operations of the MCU.

7. A field-oriented control ("FOC") motor controller, comprising:
a low speed estimator to inject an excitation voltage signal ("V_D_EXC") into a stator current control portion of the FOC controller and to process V_D_EXC-related components of Park-transformed values I_D and I_Q of currents measured in stator windings of a motor to be controlled by the FOC controller in order to generate low speed estimates of a flux angle of a rotor in the motor ("LS_θ_EST") and an angular velocity of the rotor relative to the stator ("LS_ω_EST");
a high speed estimator to calculate variations in a back-EMF induced in the stator windings by rotating magnetic fields associated with permanent magnets embedded in the rotor during a time when the rotor is in a rotating state and to generate high speed estimates of the rotor flux angle ("HS_θ_EST") and the rotor angular velocity ("HS_ω_EST") from the back-EMF calculations; and
an acceleration control logic module communicatively coupled to the low speed estimator and to the high speed estimator to track LS_ω_EST and HS_ω_EST relative to a low rotor angular velocity threshold value ω_LOW_THRS and a high rotor angular velocity threshold value ω_HIGH_THRS and to select LS_ω_EST or HS_ω_EST as an estimated rotor flux angle input ("θ_EST") to Park and inverse Park transform modules associated with the FOC controller to establish θ_EST equal to LS_θ_EST while rotor angular velocity is less than ω_LOW_THRS, to maintain ω_EST equal to LS_θ_EST while rotor angular velocity is less than ω_HIGH_THRS after accelerating to an angular velocity greater than ω_LOW_THRS, to establish ω_EST equal to HS_ω_EST while rotor angular velocity is greater than ω_HIGH_THRS, and to maintain ω_EST equal to HS_ω_EST while rotor angular velocity is greater than ω_LOW_THRS after decelerating to an angular velocity lower than ω_HIGH_THRS.

8. The FOC controller of claim 7, further comprising:
an I_Q trajectory generator coupled to the acceleration control logic module to receive at least one I_Q trajectory curve ("IQTC") parameter value from the acceleration control logic module and to generate a set of time-sequenced values of a motor torque reference current signal I_Q_REF in the shape of an IQTC, the IQTC parameter values(s) selected by the acceleration control logic module to correspond to one of rotor angular velocities less than ω_HIGH_THRS when ω_EST is equal to LS_ω_EST and to rotor angular velocities greater than ω_LOW_THRS when ω_EST is equal to HS_ω_EST.

9. The FOC controller of claim 7, further comprising:
a first set of analog-to-digital converters ("ADCs"), each ADC to receive an analog representation of an instantaneous current flowing in one of the motor stator windings, the first set of ADCs to generate a three-dimensional stator current vector I_ABC;
a second set of ADCs, each ADC to receive an analog representation of an instantaneous voltage measured across one of the motor stator windings, the second set of ADCs to generate a three-dimensional stator voltage vector V_ABC; and
an ADC to receive an analog representation of a reference voltage to an inverter used to apply an AC drive voltage across each motor winding and to convert the reference voltage representation to a digital value.

10. The FOC controller of claim 9, further comprising:
a first Clarke transform module coupled to the first set of ADCs to convert the three-dimensional stator current vector IABC to a two-dimensional stator current vector I_αβ;
a first Park transform module coupled to the first Clarke transform module to convert the two-dimensional stator current matrix I_αβ to a direct-axis stator current representation I_D and a quadrature-axis stator current representation I_Q in a reference frame rotating with respect to the stator;
a second Clarke transform module coupled to the second set of ADCs to convert the three-dimensional stator voltage vector V_ABC to a two-dimensional stator voltage vector V_αβ; and a second Park transform module coupled to the second Clarke transform module to convert the two-dimensional stator voltage vector $V\_\alpha\beta$ to a direct-axis stator voltage representation $V\_D$ and a quadrature-axis stator voltage representation $V\_Q$ in a reference frame rotating with respect to the stator.

11. The FOC controller of claim 10, further comprising:

a direct-axis error amplifier coupled to the first Park transform module to generate a direct-axis error signal by subtracting values of $I\_D$ from values of a direct-axis reference input $I\_D\_REF$; and a quadrature-axis error amplifier coupled to the $I\_Q$ trajectory generator to generate a quadrature-axis error signal by subtracting values of $I\_Q$ from quadrature-axis reference values generated by the $I\_Q$ trajectory generator.

12. The FOC controller of claim 11, further comprising:

a direct-axis controller coupled to the direct-axis error amplifier to receive the direct-axis error signal and to generate a direct-axis rotor control voltage signal $V\_D\_CTL$; and a quadrature-axis controller coupled to the quadrature-axis error amplifier to receive the quadrature-axis error signal and to generate a quadrature-axis rotor control voltage signal $V\_Q\_CTL$.

13. The FOC controller of claim 12, further comprising:

an inverse Park transform module coupled to the direct-axis controller and to the quadrature axis controller to receive $V\_D\_CTL$ and $V\_Q\_CTL$ and to generate a two-dimensional stator control voltage signal $V\_\alpha\beta\_CTL$ in a stator reference frame;

a space vector generator coupled to the inverse Park transform module to perform an inverse Clarke transformation and to generate timing signals $T\_ABC$, each proportional to a desired voltage across each stator winding; and a three-phase pulse-width modulation ("PWM") driver coupled to the space vector generator to convert each of the timing signals $T\_ABC$ to a PWM pulse train, a duty cycle of each PWM pulse train proportional to a drive voltage level to be applied across each stator winding.

14. The FOC controller of claim 7, the acceleration control logic module further comprising:

a selection state logic module to select a rotor angular velocity estimate $\omega\_EST\_SEL$ and a rotor angular velocity threshold value $\omega\_THRS\_SEL$, to receive a result of a comparison of $\omega\_EST\_SEL$ to $\omega\_THRS\_SEL$ and, from the comparison, to enter a low-speed state, a low-to-high speed state, a high speed state, or a high-to-low speed state;

a rotor flux angle estimate selector coupled to the selection state logic module to receive $LS\_\theta\_EST$ and $HS\_\theta\_EST$ as inputs and to select $LS\_\theta\_EST$ or $HS\_\theta\_EST$ as an output responsive to a rotor flux angle estimate control input from the selection state logic module; and a trajectory generator parameter selector coupled to the selection state logic module to receive quadrature-axis IQTC parameter values $LS\_I\_Q\_MAX$, $LS\_I\_Q\_SLOPE$, $HS\_I\_Q\_MAX$, and $HS\_I\_Q\_SLOPE$, to select a maximum quadrature-axis reference value $I\_Q\_MAX$ as $LS\_I\_Q\_MAX$ or $HS\_I\_Q\_MAX$, and to select a slope of a quadrature-axis reference value curve $I\_Q\_SLOPE$ as $LS\_I\_Q\_SLOPE$ or $HS\_I\_Q\_SLOPE$ responsive to a trajectory generator parameter control input from the selection state logic module.

15. The FOC controller of claim 14, the acceleration control logic module further comprising:

a first trajectory generator parameter register coupled to the trajectory generator parameter selector to store $LS\_I\_Q\_MAX$;

a second trajectory generator parameter register coupled to the trajectory generator parameter selector to store $LS\_I\_Q\_SLOPE$;

a third trajectory generator parameter register coupled to the trajectory generator parameter selector to store $HS\_I\_Q\_MAX$; and a fourth trajectory generator parameter register coupled to the trajectory generator parameter selector to store $HS\_I\_Q\_SLOPE$.

16. The FOC controller of claim 14, the acceleration control logic module further comprising:

an angular velocity comparator coupled to the selection state logic module to receive $LS\_\omega\_EST$, $HS\_\omega\_EST$, $\omega\_LOW\_THRS$ and $\omega\_HIGH\_THRS$ as inputs, to compare a selected one of $LS\_\omega\_EST$ or $HS\_\omega\_EST$ to a selected one of $\omega\_LOW\_THRS$ or $\omega\_HIGH\_THRS$ responsive to control signals $\omega\_EST\_SEL$ and $\omega\_THRS\_SEL$ received from the selection state logic module, and to send the result of the comparison to the selection state logic module;

an $\omega\_LOW\_THRS$ register coupled to the angular velocity comparator to store a value of $\omega\_LOW\_THRS$; and an $\omega\_HIGH\_THRS$ register coupled to the angular velocity comparator to store a value of $\omega\_HIGH\_THRS$.

17. The FOC controller of claim 14, the acceleration control logic module further comprising:

a low speed estimator enable/disable logic module coupled to the selection state logic module to disable and re-enable the low speed estimator responsive to a state control signal received from the selection state logic module.

18. A method of smoothly controlling rotor angular acceleration in a multi-phase alternating current ("AC") motor with a permanent magnet rotor ("PMAC motor"), comprising:

in a field-oriented control ("FOC") controller to be used to control the PMAC motor, receiving low speed estimates of a rotor flux angle ("$LS\_\omega\_EST$") and a rotor angular velocity ("$LS\_\omega\_EST$") from a low speed estimator;

receiving high speed estimates of the rotor flux angle ("$HS\_\omega\_EST$") and of the rotor angular velocity ("$HS\_\omega\_EST$") from a high speed estimator;

tracking $LS\_\omega\_EST$ and $HS\_\omega\_EST$ relative to a low rotor angular velocity threshold value $\omega\_LOW\_THRS$ and relative to a high rotor angular velocity threshold value $\omega\_HIGH\_THRS$; and selecting $LS\_\omega\_EST$ or $HS\_\omega\_EST$ as an estimated rotor flux angle input ("$\theta\_EST$") to Park and inverse Park transform modules associated with the FOC controller to establish $\theta\_EST$ equal to $LS\_\omega\_EST$ while rotor angular velocity is less than $\omega\_LOW\_THRS$, to maintain $\omega\_EST$ equal to $LS\_\omega\_EST$ while rotor angular velocity is less than $\omega\_HIGH\_THRS$ after accelerating to an angular velocity greater than $\omega\_LOW\_THRS$, to establish $\omega\_EST$ equal to $HS\_\omega\_EST$ while rotor angular velocity is greater than $\omega\_HIGH\_THRS$, and to maintain $\omega\_EST$ equal to $HS\_\omega\_EST$ while rotor angular velocity is greater than $\omega\_LOW\_THRS$ after decelerating to an angular velocity lower than $\omega\_HIGH\_THRS$.

19. The method of smoothly controlling rotor angular acceleration in a PMAC motor of claim 18, further comprising:

selecting a subset of IQTC parameter values from a set of IQTC parameter values, the selected subset of IQTC parameter values to be used to control characteristics of a IQTC representing a set of time-sequenced values of a motor torque reference current signal I_Q_REF, the selected subset to correspond to rotor angular velocities less than ω_HIGH_THRS when ω_EST is equal to LS_ω_EST and to rotor angular velocities greater than ω_LOW_THRS when ω_EST is equal to HS_ω_EST.

20. The method of smoothly controlling rotor angular acceleration in a PMAC motor of claim 18, further comprising:

disabling the low speed estimator at a time when the rotor angular velocity to generates accurate values of HS_ω_EST.

* * * * *